United States Patent

[11] 3,552,307

| [72] | Inventor | Phillip G. Venable<br>Orion, Ill. |
|---|---|---|
| [21] | Appl. No. | 840,229 |
| [22] | Filed | July 9, 1969 |
| [45] | Patented | Jan. 5, 1971 |
| [73] | Assignee | J. I. Case Company<br>Racine, Wis.<br>a corporation of Wisconsin |

[54] BALER HAVING A SELF-LOCATING PLUNGER
4 Claims, 2 Drawing Figs.

| [52] | U.S. Cl. | 100/98 |
|---|---|---|
| [51] | Int. Cl. | B30b 15/58 |
| [50] | Field of Search | 100/98, 179, 188 |

[56] References Cited
UNITED STATES PATENTS

| 2,630,063 | 3/1953 | Paradise | 100/98 |
| 2,720,160 | 10/1955 | Tice et al. | 100/98 |
| 3,059,569 | 10/1962 | Nolt | 100/98 |

FOREIGN PATENTS

| 123,066 | 5/1931 | Austria | 100/98 |

*Primary Examiner*—Billy J. Wilhite
*Attorney*—Arthur J. Hansmann

ABSTRACT: A baler having a self-locating plunger, and a bale case defines the bale chamber and the case has an inlet opening on one side. The plunger is guided in its reciprocation in the bale case, and it carries a knife which moves against a shear bar for cutting the crop. The bale plunger is guided by a ramp or inclined surface which moves the knife into shearing relationship with the shear bar, and the knife is offset just before it reaches the shear bar and then is retained in the offset or shearing position while it moves over the shear bar. Rollers are mounted on the plunger for guiding it in the bale case, and the plunger is therefore adjustable relative to the guides and the shear bar.

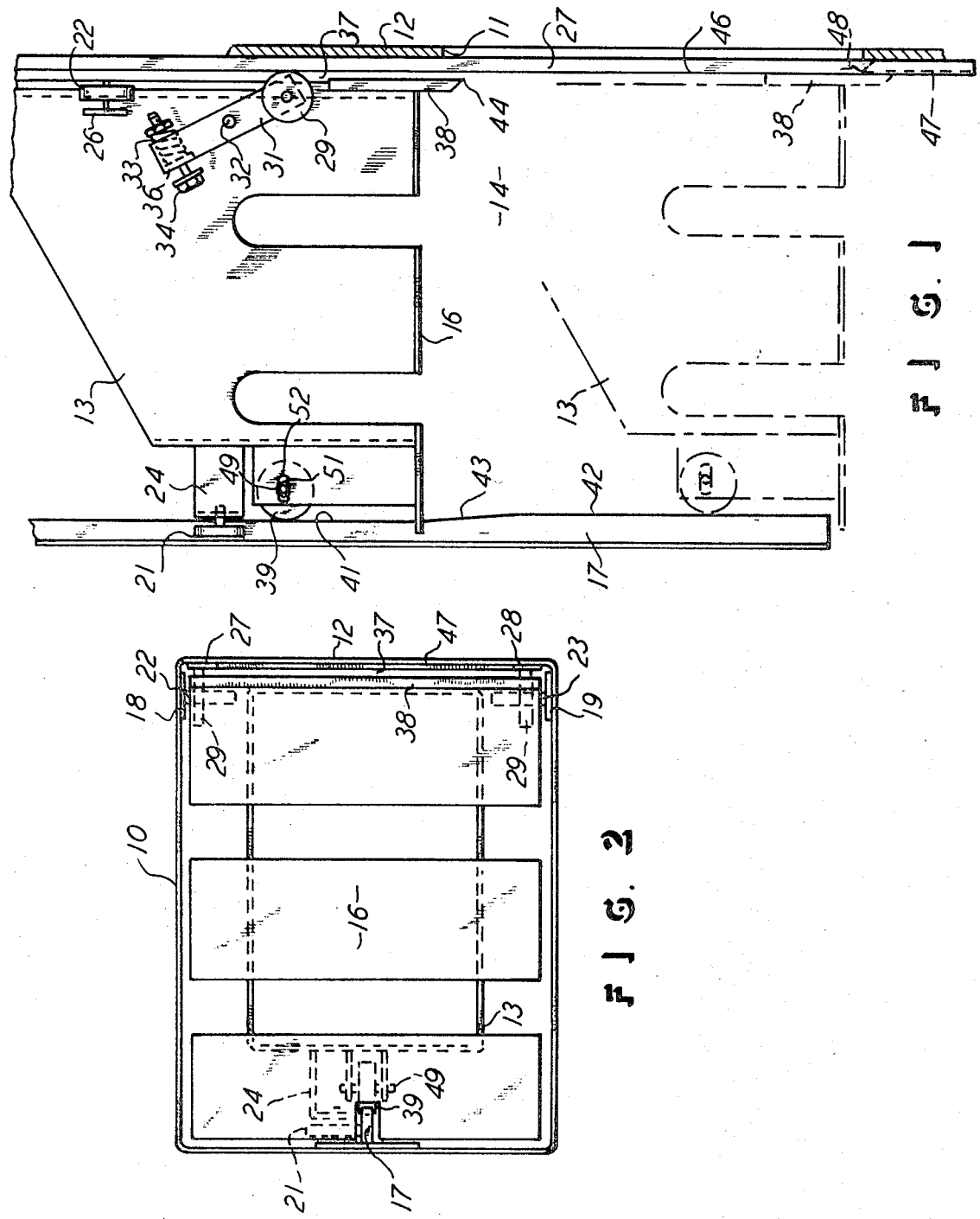

BALER HAVING A SELF-LOCATING PLUNGER

This invention relates to a baler having a self-locating plunger. More particularly, this invention relates to a baler having a plunger which carries a crop cutting knife, and the plunger and knife are guided in a bale case to bring the knife into shearing relationship with a shear bar mounted on the bale case.

BACKGROUND OF THE INVENTION

The prior art is already aware of crop balers which utilize reciprocable plungers for compressing the crop into bales. The plungers reciprocate in bale cases having openings for receiving the crop, and the balers also include knives and shear bars for cutting the crop to form the discrete bales. Further, the prior art is developed to provide roller types of guides for the plunger in the bale case, and these rollers may be located on both sides of the plunger. It is also a common practice to guide the plunger along wear strips or surfaces on the bale case. In such instances, the knife on the plunger is slid along a wear strip or surface to a point where the knife meets the shear bar for cutting the crop.

However, in these prior art structures, the plunger encounters a considerable resistance and wear in sliding along the wear strips or surfaces. Of course the provision of rollers on the plunger alleviates some of the resistance and wear, but the plunger knife must still be moved along the wear strip or surface as the knife approaches the shear bar.

It is an object of this invention to provide a baler with a plunger which is guided within the bale case to present only a minimum of wear and resistance in the movement of the plunger within the bale case. In accomplishing this particular object, the plunger is provided with rollers which are disposed on opposite sides of the plunger, and one of the rollers engages a ramp or inclined surface to gradually offset the plunger to a position where its knife is in cutting position with the shear bar on the bale case but only at the optimum time for the cutting action.

Another object of this invention is to provide a baler with a movable plunger which can be adjustably positioned in the bale case and in the direction transverse to the longitudinal axis of the case. In this accomplishment, the plunger is movably supported in the bale case with a minimum of resistance and wear, and there is a resulting optimum efficiency in the baler.

Still another object of this invention is to provide a baler with a movable plunger which can be adjustably positioned transversely to the longitudinal axis of the case, and thereby compensate for dimensional variations in the bale case and the cutting knife and shear bar relationship. In accomplishing this object, each baler made according to this invention is capable of having its plunger adjusted to best suit the bale case in which the plunger is located, and the adjustments shown in this invention are that of a spring-loaded roller and an adjustably mounted roller, with the two rollers located on opposite sides of the plunger and guided along the opposite sides of the bale case.

In summary, some balers are made with hardened steel wear pads or strips to guide the plunger. However, in excessive abrasive conditions in certain crop harvesting areas, the life of the baler is too short. A roller-mounted plunger can be used to alleviate the short-life problem, although such plunger presents different problems. The knife on the plunger must cooperate with the shear bar to satisfactorily cut the crop, and this requires that the knife be retained in snug shearing contact with the shear bar. Where rollers are used on the plunger, the knife tends to move away from the shear bar and excessive clearance exists between the knife and the shear bar so that the crop is not properly cut. Therefore, the present invention solves these problems by providing a roller-mounted plunger which can be adjusted within the bale case, and the knife can be brought into proper shearing position with the shear bar. This inventive arrangement therefore allows for manufacturing tolerances in the bale case and the plunger itself, and these tolerances which present dimensional variations can be compensated for in the roller-mounted plunger of this invention. That is, the plunger can be adjusted to have the knife come into proper shearing position with the shear bar, and also the plunger will be withdrawn from the shear bar when the plunger is being retracted in the bale case and no cutting action is desired so there will be a minimizing of the wear of the parts involved.

BRIEF DESCRIPTION OF THE DRAWING

FIG. 1 is a top plan view of a preferred embodiment of this invention, and showing the plunger in a second position in dot-dash lines.

FIG. 2 is an end elevational view of FIG. 1 and with the additional portion of the bale case added thereto.

DETAILED DESCRIPTION OF THE PREFERRED EMBODIMENT

The baler is shown to include a bale case 10 having a crop inlet opening 11 extending in one vertical wall 12 of the surrounding case 10. A plunger 13 is reciprocably mounted in the bale case 10, and it will be understood that the case 10 extends along the direction of longitudinal movement of the plunger 13, in the usual manner of arranging a bale case and plunger.

Thus, crop, such as hay or the like, will enter the bale case 10 by moving through the opening 11 and into the bale chamber designated 14. In the full line position of the plunger 13 in FIG. 1, the plunger face 16 is against the crop in the chamber 14. When the plunger 13 moves to the dot-dash line position shown in FIG. 1, the crop is also moved along the longitudinal axis of the bale chamber 14, all in the usual manner of baler operation.

To guide the plunger 13 in the bale case 10, and to support it vertically in the baler, horizontally extending guide pieces 17, 18, and 19 are affixed as a part of the bale case 10. These three pieces support rollers 21, 22, and 23, respectively, which are suitably rotatably mounted on the plunger 13. Thus brackets 24 and 26 extend from the plunger 13 for providing the mounting of the rollers shown.

Also affixed to the bale case are plunger guides or wear strips 27 and 28 which extend along the bale case wall 12 and across the inlet opening 11, above and below the opening 11, as seen in FIG. 2. Two rollers 29 are spring mounted on the plunger 13 and are in rolling contact with the guides 27 and 28. Roller support arms 31 are pivotally mounted on the plunger on pin 32, and one end of the arm 31 rotatably supports the roller 29, while the other end of the arm 31 is influenced by a compression spring 33 centered on an adjustable bolt 34 held to the baler plunger 13 by a bracket 36 on the plunger 13. Thus, the roller 29 is spring urged against the guide 27, on the top roller 29, and it will be understood that there is also a bottom roller 29 spring urged against the guide 28. Thus the spring-loaded rollers 29 urge the plunger 13 away from the wear strips 27 and 28, to provide the space designated 37 between a crop cutting knife 38 affixed to the plunger 13 and the wear strips 27 and 28. FIG. 2 shows the knife 38 extending for the height of the plunger 13 so that the knife extends for the height of the opening 11 and can cut the crop protruding through the opening 11, in a manner hereinafter described.

A single roller 39 is affixed to the plunger 13 and is in rolling contact with the plunger guide 17. The guide 17 has a first surface 41 and a second surface 42, with the two surfaces being on planes offset from each other but with the planes being parallel to the longitudinal axis of the bale case 10. The guide 17 also has an inclined surface or a ramp 43 which is contiguous with the two surfaces or portions 41 and 42 and extends between the two and connects them, as shown in FIG. 1. It will therefore be understood and seen that the plunger 13 is guided by the guide 17 to be offset relative to the longitudinal axis of the bale case 10, and such offset is in accord with the planes of the surfaces 41 and 42 as the roller 39 moves from the full line position to the dot-dash line position shown in FIG. 1. Such movement causes the entire plunger 13, and particularly its knife 38, to also offset and to bring the knife 38 into snug sliding contact with the wear strips 27 and 28, as shown by the dot-dash lines in FIG. 1. With the location of the inclined surface 43 and with the location of the roller 39 on the plunger 13, the knife cutting tip or edge 44 will move into the sliding contact with the strips 27 and 28 at the location indicated by reference numeral 46 on wear strips 27 and 28. Thus, the knife 38 is brought into its offset position against the wear strips 27 and 28 only after it has moved across most of the inlet opening 11, and the knife is not held against these wear strips 27 and 28 for the entire stroke of the plunger 13. Therefore, the wear on the parts described, and the power required to move the plunger 13, are both at a minimum. A shear bar 47 is fixedly mounted on the bale case 10 and presents a cutting edge 48 which cooperates with the knife edge 44 in cutting the hay at the point of the location of the edge 48. That is, the knife 38 is offset to align with the shear bar 47, and the shear bar 47 is therefore located to have its edge 48 flush with the inner surfaces of the wear strips 27 and 28 so that the two edges 44 and 48 will properly mate for the desired cutting action. In order to show the bar 47 in FIG. 1, it is shown in the dotted lines and should be understood to be extending along the inner surfaces of guides 27 and 28, as described, so that the two cutting edges will come together, as described, and as shown with the alignment of the shear bar 47 and the wear strips 27 and 28 in FIG. 2.

Therefore, with the roller mounting of the plunger 13 as described, it will be understood that the rollers 29 yieldingly urge the plunger 13 away from the wear strips 27 and 28. However, the incline 43 on the guide 17 positively moves the plunger 13 against the wear strips 27 and 28 and into the desired cutting position described. To do this, the rollers 29 will slightly retract from their positions shown, and when the roller 39 rides up on the ramp 43. However, upon the retracting stroke of the plunger 13, that is from the dot-dash line position back to the full line position shown in FIG. 1, then the rollers 29 are available for positively moving the plunger 13 away from the wear strips 27 and 28 as the roller 39 moves down the ramp surface 43.

To permit maximum fitting and adjustment of the plunger 13 relative to the bale case 10, the roller 39 is adjustably mounted on the plunger 13 by means of the threaded roller axle 49 and the nut 51 securing the axle 49 in a selected position along the slot 52 in the plunger 13. Thus the axle 49 and its roller 39 can be moved relative to the slot 52 for the adjustment of the roller 39 on the plunger 13. Thus, the roller 39 would be set in a selected position to bring the cutting edges 44 and 48 into shearing action as described. It will also be understood that the knife 38 remains in sliding contact with the shear bar 47 beyond the point where the cutting edges 44 and 48 are adjacent each other, so that the crop cannot get between the knife 38 and the bar 47 to interfere with the alignment of parts and the cutting action desired. The rollers 29 and the roller 39 are on the same plane extending transverse to the longitudinal axis of the bale case 10, and this provides for maximum control of the plunger 13 without tipping or cocking of the plunger 13 in the bale case 10. Also, the inclined surface 43 is an offset portion on the guide 17, and the amount of offset or incline is that amount desired to offset or displace the plunger 13 in the direction transverse to the longitudinal axis of the bale case 10. Thus the plunger 13 is positively moved into the crop cutting position and it is gradually moved into that position by the incline 13, rather than have it moved under only a yielding spring or abruptly moved over. Further, the relationship between the inclined surface 43 and the crop inlet opening 11 is such that the initial edges of each, as these edges are shown relative to the plunger face 16, are essentially aligned with each other across the bale case 10, and the relationship of these locations, along with the location of the roller 39 on the plunger 13, all provide for the desired offset movement of the plunger 13 for the advantages described. This also results in having the knife 38 in snug sliding contact with the wear strips 27 and 28 for approximately an equal distance both before and after the cutting alignment of the edges 44 and 48. That is, if the knife 38 is in sliding contact with the wear strips 27 and 28 for a distance of 6 inches prior to moving into cutting relationship with the edge 48, then the knife is in a 6 inch sliding contact with the wear strips 27 and 28 after the cutting action described. However, such total length of sliding contact is an optimum amount for most efficient cutting and for minimum wear of the parts and minimum power required for moving the parts.

I claim:

1. In a baler having a self-locating plunger, a bale case defining a bale chamber having a longitudinal axis and having an inlet opening in one side for the entrance of hay into said bale chamber, a plunger reciprocably disposed in said bale case and being movable along said longitudinal axis and across said inlet opening for compressing hay in said bale chamber, a knife on said plunger, a shear bar adjacent said inlet opening of said bale case and having a cutting edge on the end toward said inlet opening to cooperate with said knife for cutting the hay during the advance of said plunger, a plunger guide on said bale case on the side thereof opposite said one side and extending in the direction of movement of said plunger and including an offset portion, a roller on said plunger and in rolling contact with said plunger guide and over said offset portion for controlling the location of said plunger in the plane transverse to said longitudinal axis to offset said knife into cutting position with said shear bar, the improvement comprising a plunger wear surface on said bale case and located across said inlet opening on and along the plane through said cutting edge of said shear bar, a second roller on said plunger and located to be in rolling contact with said plunger wear surface, a spring operatively connected with said second roller for yieldingly urging the first said roller into snug contact with said plunger guide, said plunger guide offset portion being a surface inclined relative to said longitudinal axis for gradually offsetting said knife toward said shear bar and against the influence of said spring during the advance of said plunger in said bale case.

2. The subject matter of claim 1, including an adjustable mounting operatively connecting said first roller to said plunger for selective positioning of said plunger and said knife in the said transverse plane and relative to said shear bar.

3. The subject matter of claim 2, wherein said plunger guide includes two spaced-apart portions disposed parallel to said longitudinal axis for guiding said plunger in the direction along said longitudinal axis, said portions being located on different planes and disposed contiguous to respective opposite ends of said inclined surface, said first roller and said inclined surface being respectively located on said plunger and said bale case for offsetting said plunger toward said plunger wear surface before and throughout the time that said knife reaches said shear bar.

4. The subject matter of claim 3, wherein the respective locations of said first roller and said inclined surface are related to said inlet opening for effecting the offsetting of said plunger after said plunger has moved across most of said inlet opening.